United States Patent [19]

Flater

[11] Patent Number: 4,760,235
[45] Date of Patent: Jul. 26, 1988

[54] MALE SPOT WELDING ELECTRODE

[76] Inventor: Anders H. Flater, 2360 Sheridan Rd., Highland Park, Ill. 60035

[21] Appl. No.: 100,629

[22] Filed: Sep. 24, 1987

[51] Int. Cl.$^4$ ............................................. B23K 11/30
[52] U.S. Cl. ....................................... 219/119; 219/120
[58] Field of Search ................................. 219/119, 120

[56] References Cited

U.S. PATENT DOCUMENTS 4,476,372  10/1984  Prucher ................................ 219/120

FOREIGN PATENT DOCUMENTS

| 493946 | 6/1950 | Belgium ............................... 219/119 |
| 42-5211 | 3/1967 | Japan ..................................... 219/119 |
| 325552 | 2/1930 | United Kingdom ................. 219/119 |
| 575742 | 3/1946 | United Kingdom ................. 219/119 |

OTHER PUBLICATIONS

*Metals Handbook*, vol. 6, 8th ed., (American Society for Metals: Metals Park, Ohio), 1971, p. 409.

Primary Examiner—E. A. Goldberg
Assistant Examiner—C. M. Sigda

[57] ABSTRACT

A male spot welding electrode includes a weld end portion having a generally flat contact surface and a tapered mounting portion containing an inlet bore. The inlet bore communicates with an internal cavity, containing cooling fins, for coolant fluid flow. The diameter of the internal cavity is made larger than the diameter of the inlet bore in order to maximize the cooling surface for the dissipation of heat generated during repeated welding operations. The male spot welding electrode is produced from a single billet of copper material through a process of back-extrusion and swaging.

7 Claims, 2 Drawing Sheets

MALE SPOT WELDING ELECTRODE

BACKGROUND OF THE INVENTION

The present invention relates, in general, to resistance spot welding equipment and, more specifically, to spot welding electrodes of the male configuration.

Resistance spot welding is a process commonly used to join two thin metal sheets together. A spot weld is produced by clamping two thin sheets of metal together under high pressure or force between two axially aligned electrodes and passing a high electrical current between the electrodes through the metal sheets. The high resistance at the interface of the two metal sheets causes heating of the sheets in an area between the contact surfaces of the electrodes. This rapid heating creates a molten zone of metal which, when cooled, forms a solid weld spot or nugget fusing the two metal sheets together.

The electrodes used to form a spot weld are typically constructed of a high electrically conductive material, such as copper. The size and shape of the electrode determine the size and shape of the spot weld. The electrodes may have an integral single piece form or may be constructed of a holder or shank portion which receives a replaceable cap or tip at one end. The caps or tips are usually of a female or male configuration. The female electrode has an open mounting end whereas the male electrode contains a tapered mounting nipple. The interior of the electrode caps or tips is provided with coolant fluid flow paths for the purpose of removing heat generated by high currents passing through the electrode. Consequently, the more hollow the electrode cap or tip can be made, the more capacity it has to dissipate the generated heat. Currently, the female cap or tip can be made more hollow than the male configuration due to the present design of the latter and the methods employed in its manufacture.

The diameter of the electrode tip, which is generally circular in form, is a critical parameter in producing spot welds of sufficient size to hold two metal sheets together. Thus, depending on the thickness of the two sheets, the electrode pressure, the welding current, etc., the diameter of the electrode is selected to produce a particular diameter weld spot sufficient to hold the two sheets together.

During repeated spot welding operations, the electrodes experience considerable deformation or wear at their contact surface due to the high clamping pressures required and the heat generated by the current passing through the electrode. Such wear or deformation causes the contact surface of the electrode to spread out or "mushroom" which increases its diameter. The increased diameter of the electrode has adverse effect on the spot weld to be produced since less heat is generated at the metal sheet interface due to dissipation of the current flow through the larger contact area of the electrodes. Thus, frequent reshaping or redressing of the electrode tip is required in order to return the tip to its original size and shape. This necessitates interruption of the welding operation which lowers production and increases labor costs since hand machining by file is typically employed to reshape the electrode tip.

Thus, the capacity of an electrode to dissipate the heat generated in the welding process is an important factor in attaining longer electrode life, savings in electrical power consumption, less sticking to the welded material and reduced maintenance cost in the welding operation. It would therefore be desireable to provide a male spot welding electrode with increased cooling capacity in comparison with currently available male spot welding electrodes.

SUMMARY OF THE INVENTION

The above and other objectives of the preferred embodiment of the invention are accomplished by a one piece male spot welding electrode which provides optimum cooling surfaces for the dissipation of heat generated during repeated welding operations. The cooling capacity is provided by an inside cavity containing a plurality of fins and where the diameter of the cavity is larger than the diameter of the inlet bore in the electrode mounting end.

The invention also includes a method of making a one piece male spot welding electrode. Currently, one piece male electrodes are manufactured by machining a billet of copper material which process prevents the diameter of the inside cavity to be larger than the diameter of the inlet bore and excludes the possibility of forming cooling fins inside the cavity. The present invention provides for one piece male electrodes to be manufactured in two stages. The first stage is a process known in the trade as "back-extrusion" whereby a billet of copper material is placed in a press and forced back between the plunger and the die wall to form a longitudinal cavity which contains a plurality of fins. This cavity forms the cooling fluid cavity in the finished electrode. The extruded billet is then removed from the press and subjected to a process, known in the trade as "Rotary Swaging" whereby the open end is swaged and reduced to a tapered fitting containing an inlet bore which communicates with the inside cavity. The inside diameter of the inlet bore at the open end of the taper is thus less than the diameter of the inside cavity containing the cooling fins.

One piece male spot welding electrodes in accordance with the present invention will now be described by way of example, with reference to the accompanying drawings, in which.

DESCRIPTION OF THE PREFERRED EMBODIMENT

As is conventional in spot welding operations, a pair of axially aligned electrodes are brought together under high force or pressure on opposite sides of two relatively thin sheets of metal. An electric current is passed between the electrodes through the sheets. The high resistance at the interface of the two metallic sheets between the electrodes causes rapid heating which creates a molten zone of metal between the contact surface areas of the electrodes. The molten zone, when cooled, forms a weld spot or nugget which fuses the two sheets together.

The term electrode, as used in the present invention, describes that portion of a spot welding apparatus which contacts the metal sheets under high force or pressure and directs current flow through the clamped sheets in an area corresponding to the contact surface of the electrode. The electrode may be formed as a single piece part having an elongated shank with a tapered mounting portion and a weld end or tip containing the contact surface of the electrode.

The purpose of the present invention is to device a one piece male electrode and its method of manufacture whereby the diameter of its inside cavity is larger than that of the inside of its inlet bore. A one piece male electrode being defined as produced from one single billet without attachments or removal of metal.

Figure 1:
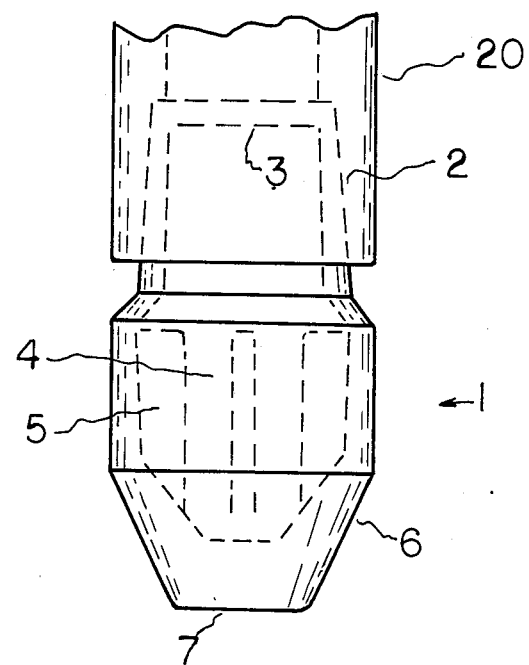
FIG. 1 is an enlarged elevational view of a one piece male spot welding electrode of the present invention containing a pointed weld end.
Figure 5:
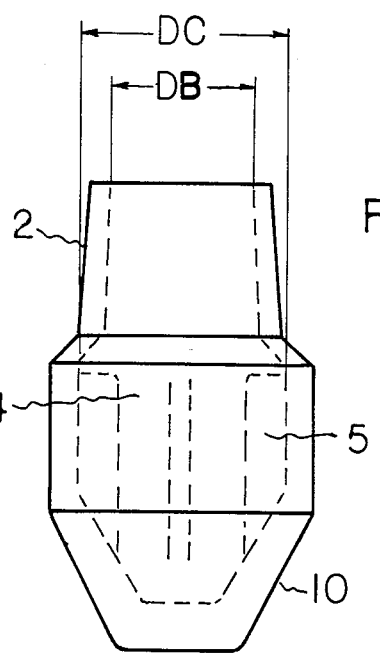
FIG. 5 is an enlarged elevational view of a one piece male spot welding electrode containing a flat weld end.
Figure 6:
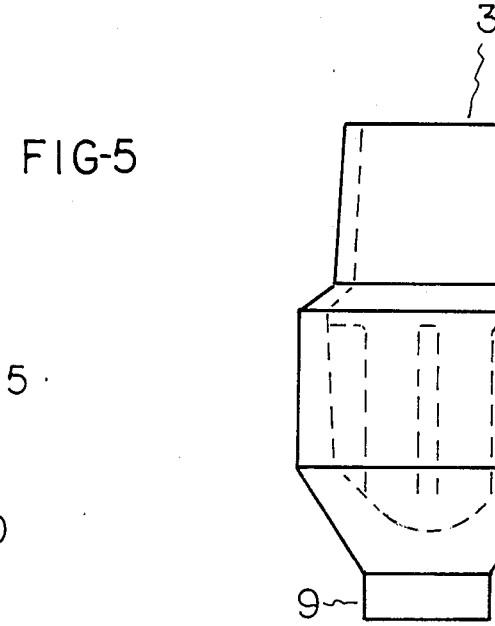
FIG. 6 is an enlarged elevational view of a one piece male spot welding electrode containing a tip weld end.
Figure 7:
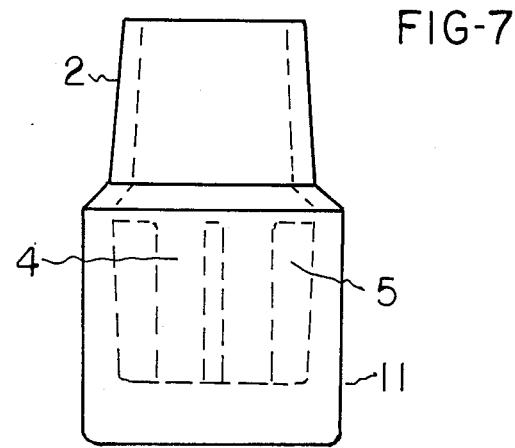
FIG. 7 is an enlarged elevational view of a one piece male spot welding electrode containing a flat weld end.
Figure 8:
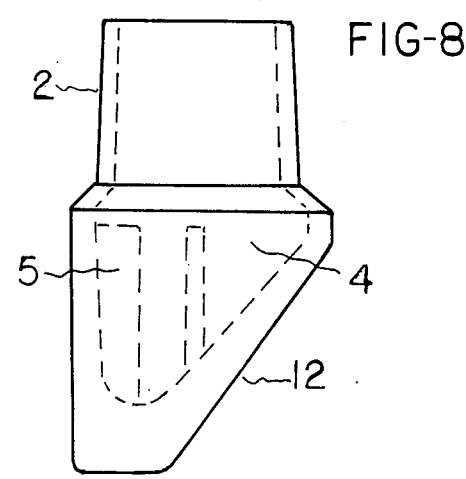
FIG. 8 is an enlarged elevational view of a one piece male spot welding electrode containing an offset weld end.

As shown by way of example in FIG. 1 and the following description, the one piece male spot welding electrode 1 of the invention includes a tapered mounting portion 2 containing inlet bore 3 having inside diameter DB. The inlet bore 3 communicates with the hollow cavity 4 of inside diameter DC containing cooling fins 5. The weld end 6 which, here by example is shown of a pointed shape with circular cross section, is formed as an integral part of the closed end of the one piece spot welding electrode and contains contact surface 7. The weld end 6, shown in FIG. 1, may be formed in various other configurations to suit the particular welding operation to be performed. For this purpose, according to the invention, FIG. 5 shows pointed weld end 10, FIG. 6 shows weld end 8 with tip 9, FIG. 7 shows flat weld end 11 and FIG. 9 shows offset weld end 12.

Figure 2:
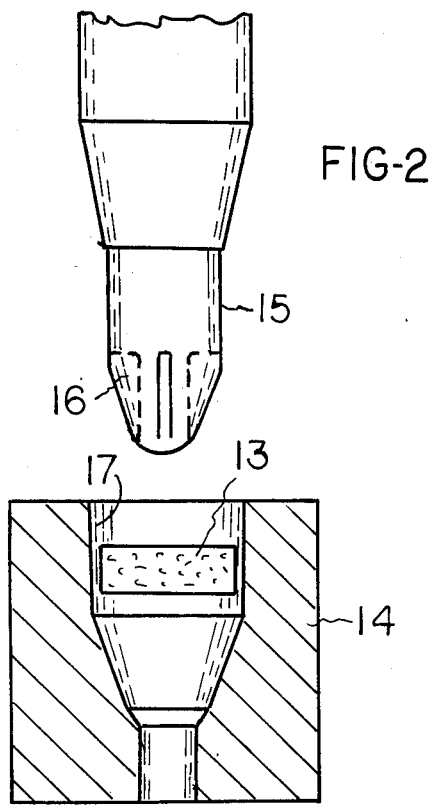
FIGS. 2 and 3 illustrate stages in the back-extrusion of a one piece male spot welding electrode of the present invention.
Figure 3:
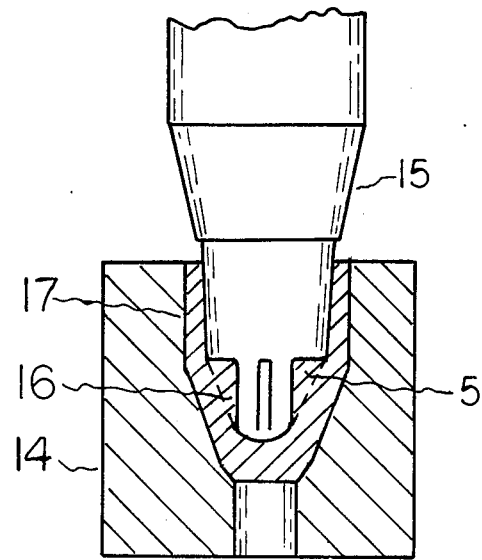

The invention includes a method for the manufacture of the one piece male spot welding electrode from a single piece of billet of copper material preferably having a circular cross section. The first stage is illustrated in FIGS. 2 and 3 whereby the billet 13 is placed in a die 14 which is mounted in a press, here not shown. The plunger 15 containing grooves 16, for the forming of cooling fins 5, is then driven into the billet 13 which spreads radially until it bears against the inner wall 17 of the die 14 and back-extrudes some of the material of the billet between the plunger 15 and the inner wall 17 to form the longitudinal cavity 4. After removal from the press the extruded billet is shown in FIG. 4 containing the open end portion 18, the hollow cavity 4 with cooling fins 5 protruding from its inside wall 19 and weld end 6 containing contact surface 7.

Figure 4:
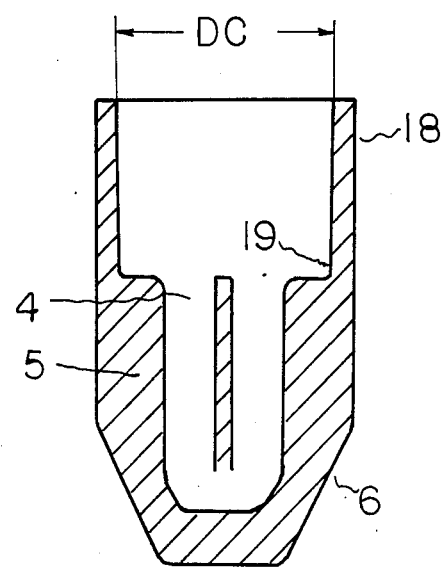
FIG. 4 is an enlarged sectional view of a back-extruded billet to be swaged into a male spot welding electrode containing a pointed weld end.

The extruded billet, as depicted in FIG. 4, is then placed in a rotary swaging machine, here not shown, where the open end portion 18 is swaged and reduced to the tapered mounting portion 2. Upon completion of the rotary swaging operation, the extruded part has been formed into a one piece male spot welding electrode as shown in FIG. 5 and following Figures where the diameter DC of cavity 4 is larger than the inside diameter DB of inlet bore 3.

In operation, the tapered mounting portion 2 of the male spot welding electrodes 1 are fitted into standard electrode holders 20 on a resistance welding machine, not shown, so as to be axially aligned on opposite sides of the metal sheets to be welded. Coolant fluid is then passed from the electrode holders 20 into the bore 3 and the hollow cavity 4 providing a flow path for the fluid within the interior of the electrodes. During the welding cycle, the welding machine closes the electrode holders which action causes the two electrodes to exert a clamping force on the metal sheets while passing a high electrical current through the junction. The high resistance at the interface of the two metal sheets creates a molten zone of metal which, when cooled, forms a solid weld nugget fusing the two sheets together.

During repeated welding operations, the cooling of the electrodes becomes an important factor in order to preserve weld quality, maintain the integrity of the electrode weld surface and increase the useful life of the electrode. Since improvements in this respect are desireable, the present invention has as its objective to increase the electrode interior surface, which is disposed in contact with the coolant fluid, over that provided in previously devised male spot welding electrodes. In this way, more heat, generated during repeated welding cycles, may be dissipated to benefit the cost and efficiency of the welding operation.

In summary, a one piece male spot welding electrode has been disclosed which overcomes many of the problems associated with previously devised male spot welding electrodes which inherently provide a limited interior surface for dissipation of the heat generated during the welding operations. This is based on previous male electrode design and method of manufacture which do not allow the diameter of the inside cavity of the electrode to be larger that the diameter of the inlet bore.

In the disclosed method of manufacture of a one piece male spot welding electrode of the present invention, the diameter of the inside cavity is made larger than the inside diameter of the inlet bore while allowing for the provision of cooling fins which extend inward from the internal wall of the cavity. In this way, the one piece male spot welding electrode of the present invention provides superior cooling capacity over previously designed male spot welding electrodes for improved welding performance, reduced electric power consumption and less electrode tip maintenance.

It will be appreciated that, while essentially portraying the subject male spot welding electrode, the enclosed drawings should not limit the scope of the invention in general.

What is claimed is:
1. A male spot welding electrode comprising:
   a billet which is backward extruded to form a one piece electrode body of generally circular cross-section having an open end portion and a closed weld end portion containing a generally flat contact surface;
   the open end portion to be reduced by a process of rotary swaging to a tapered mounting portion containing an inlet bore communicating with an internal cavity thus established inside the one piece electrode body for coolant fluid flow, the inside diameter of the internal cavity being larger than the inside diameter of the inlet bore, the internal cavity containing a plurality of circumferentially spaced fins extending inwardly from the side walls of the internal cavity to form heat transfer surfaces.
2. The male spot welding electrode of claim 1, wherein the tapered mounting portion is removably emplaceable into an electrode holder having an internal bore which communicates with the inlet bore for the flow of cooling fluid.

3. The male spot welding electrode of claim 1, wherein the closed weld end portion may be formed into a variety of standard and special electrode face or nose shapes to suit particular welding conditions.

4. The male spot welding electrode of claim 1, wherein the weld end portion has a tip configuration.

5. The male spot welding electrode of claim 1, wherein the weld end portion has a pointed configuration.

6. The male spot welding electrode of claim 1, wherein the weld end portion has a flat configuration.

7. The male spot welding electrode of claim 1, wherein the weld end portion has an offset configuration.

* * * * *